US009047112B2

(12) United States Patent
Parthiban et al.

(10) Patent No.: US 9,047,112 B2
(45) Date of Patent: Jun. 2, 2015

(54) INSTALLATION OF VIRTUAL SERVICE PROCESSOR TO COMPUTER SYSTEM HAVING EXISTING OPERATING SYSTEM

(71) Applicant: American Megatrends, Inc., Norcross, GA (US)

(72) Inventors: Baskar Parthiban, Johns Creek, GA (US); Varadachari Sudan Ayanam, Suwanee, GA (US); Samvinesh Christopher, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 220 days.

(21) Appl. No.: 13/796,373

(22) Filed: Mar. 12, 2013

(65) Prior Publication Data

US 2014/0282500 A1 Sep. 18, 2014

(51) Int. Cl.
*G06F 9/455* (2006.01)
*G06F 11/30* (2006.01)

(52) U.S. Cl.
CPC ............ *G06F 9/45533* (2013.01); *G06F 11/30* (2013.01); *G06F 2009/45591* (2013.01)

(58) Field of Classification Search
USPC .......................................................... 718/1
See application file for complete search history.

(56) References Cited

U.S. PATENT DOCUMENTS

| 6,732,230 | B1 * | 5/2004 | Johnson et al. | 711/114 |
| 2004/0088692 | A1 * | 5/2004 | Stutton et al. | 717/168 |
| 2007/0136568 | A1 * | 6/2007 | Ding | 713/1 |
| 2008/0295095 | A1 * | 11/2008 | Watanabe et al. | 718/1 |
| 2011/0047542 | A1 * | 2/2011 | Dang et al. | 718/1 |
| 2013/0185460 | A1 * | 7/2013 | Bobak | 710/15 |

* cited by examiner

*Primary Examiner* — Emerson Puente
*Assistant Examiner* — Steven Do
(74) *Attorney, Agent, or Firm* — Morris Manning & Martin, LLP; Tim Tingkang Xia, Esq.

(57) ABSTRACT

System and method for installation of a virtual service processor (VSP) are disclosed. The system include a computer that has a processor, a physical drive having a first partition and a master boot record (MBR) with initial settings indicating the first partition as an active bootable partition, and a non-transitory computer storage medium having computer-executable instructions. The instructions cause the processor to (a) load and execute a hypervisor from the computer storage medium, the hypervisor having a privileged domain and an unprivileged domain; (b) initiate a VSP in the privileged domain, the VSP being configured to manage at least one health, operation, or performance related aspect of the computer system; (c) configure the unprivileged domain to allow an operating system to run therein, the operating system (OS) being executable directly on the computer system; and (d) load and execute the OS in the unprivileged domain.

19 Claims, 6 Drawing Sheets

INSTALLATION OF VIRTUAL SERVICE PROCESSOR TO COMPUTER SYSTEM HAVING EXISTING OPERATING SYSTEM

FIELD

The present disclosure relates to the field of computer systems and particularly to installation of a virtual service processor (VSP) to a computer system having an existing operating system (OS).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A service processor (SP) or a baseboard management controller (BMC) refers to a specialized microcontroller that manages the interface between system management software and platform hardware. The SP can be embedded on the motherboard of a computer, generally a server. Thus, different types of sensors can be built into the computer system, and the SP reads these sensors to obtain parameters such as temperature, cooling fan speeds, power status, operating system (OS) status, etc. The SP monitors the sensors and can send alerts to a system administrator via the network if any of the parameters do not stay within preset limits, indicating a potential failure of the system. The administrator can also remotely communicate with the SP to take some corrective action such as resetting or power cycling the system to get a hung OS running again.

A VSP virtualizes a complete SP or BMC hardware and the functionality. Installation of the VSP environment, however, may create problems. Therefore, a heretofore unaddressed need still exists in the art to address the aforementioned deficiencies and inadequacies.

SUMMARY

Certain aspects of the present disclosure are directly to a non-transitory computer storage medium. The non-transitory computer storage medium stores computer-executable instructions. When the computer-executable instructions are executed by a processor of a computer system that has a physical drive having a first partition including an operating system (OS) and a master boot record (MBR) with initial settings indicating the first partition as an active bootable partition, the computer-executable instructions cause the processor to: (a) load and execute a hypervisor from the non-transitory computer storage medium, the hypervisor having a privileged domain and an unprivileged domain, (b) initiate a virtual service processor (VSP) in the privileged domain, the VSP being configured to manage at least one health, operation, or performance related aspect of the computer system, (c) configure the unprivileged domain to allow the operating system to run therein, the operating system (OS) being executable directly on the computer system, and (d) load and execute the OS in the unprivileged domain.

In certain embodiments, the computer-executable instructions also cause the processor to: (a) initiate a virtual drive in the unprivileged domain, and (b) instruct a virtue CPU of the hypervisor, in accordance with the virtual MBR, to load an OS from the virtual partition and execute that OS of the virtual partition in the unprivileged domain. The virtual drive has (a) a virtual partition that includes a reference to the OS stored in the physical drive and (b) a virtual MBR that indicates the virtual partition as an active bootable partition. The computer-executable instructions further cause the processor to: (a) load the OS from the first partition of the physical drive, and (b) execute the hypervisor to provide the loaded OS to the virtual CPU.

In certain embodiments, the computer-executable instructions also cause the processor to: (a) configure the virtual MBR to have same settings as the initial settings of the MBR of the physical drive, and (b) configure the unprivileged domain to emulate hardware configurations of the computer system.

In certain embodiments, the computer-executable instructions cause the processor to: (a) create a second partition in the physical drive, (b) copy a virtual SP environment file including a hypervisor file and a virtual SP file from the non-transitory computer storage medium to the second partition of the physical drive, wherein the virtual SP environment file is a bootable file instructing the processor to initiate the hypervisor and to initiate the VSP in the privileged domain of the hypervisor, and (c) modify a partition table of the MBR of the physical drive to have settings indicating that the second partition of the physical drive is an active bootable partition. The computer-executable instructions cause the processor to: (a) create a second partition in the physical drive, (b) copy a virtual SP environment file including a hypervisor file and a virtual SP file from the non-transitory computer storage medium to the second partition of the physical drive, wherein the virtual SP environment file is a bootable file instructing the processor to initiate the hypervisor and to initiate the VSP in the privileged domain of the hypervisor, and (c) modify a partition table of the MBR of the physical drive to have settings indicating that the second partition of the physical drive is an active bootable partition.

In certain embodiments, the computer-executable instructions also cause the processor to: (a) store configurations of the virtual MBR in a configuration space of the physical drive for the unprivileged domain, such that in a next booting process the hypervisor initiates the virtual MBR to have the initial settings of the MBR of the physical drive and to indicate that the virtual partition having a reference to the OS in the physical drive is an active bootable partition, and (b) store configurations of the unprivileged domain in a configuration space of the physical drive for the unprivileged domain, such that in a next booting process the hypervisor initiates the unprivileged domain to emulate hardware configurations of the computer system.

In certain embodiments, the non-transitory computer storage medium is a detachable bootable data storage medium. The detachable bootable data storage medium includes a universal serial bus (USB) disk, a memory card, a soft disk drive, a portable hard drive, an optical disk drive, a data cartridge, or a network storage device.

Certain aspects of the present disclosure are directly to a method for installation of virtual service processor to a computer system. The computer system has a processor, a physical drive having a first partition including an operating system (OS) and a master boot record (MBR) with initial settings indicating the first partition as an active bootable partition. The method includes: (a) loading computer-executable instructions from a non-transitory computer storage medium and executing a hypervisor having a privileged domain and an unprivileged domain, (b) initiating a virtual service processor (VSP) in the privileged domain, the VSP being configured to manage at least one health, operation, or performance related aspect of the computer system, (c) configuring the unprivileged domain to allow the operating system directly on the computer system, and (d) loading and executing the OS in the unprivileged domain.

In certain embodiments, the method includes: (a) initiating a virtual drive having (i) a virtual partition that includes a reference to the OS stored in the physical drive in the unprivileged domain, and (ii) a virtual MBR that indicates the virtual partition as an active bootable partition, (b) instructing a virtue CPU of the hypervisor, in accordance with the virtual MBR, to load an OS from the virtual partition and execute that OS of the virtual partition in the unprivileged domain, (c) loading the OS from the first partition of the physical drive, and (d) executing the hypervisor to provide the loaded OS to the virtual CPU.

In certain embodiments, the method also includes: (a) configuring the virtual MBR to have same settings as the initial settings of the MBR of the physical drive, (b) configuring the unprivileged domain to emulate hardware configurations of the computer system, (c) creating a second partition in the physical drive, (d) copying a virtual SP environment file including a hypervisor file and a virtual SP file from the non-transitory computer storage medium to the second partition of the physical drive, where the virtual SP environment file is a bootable file instructing the processor to initiate the hypervisor and to initiate the VSP in the privileged domain of the hypervisor, and (e) modifying a partition table of the MBR of the physical drive to have settings indicating that the second partition of the physical drive is an active bootable partition.

In certain embodiments, the method includes: (a) storing configurations of the virtual MBR in a configuration space of the physical drive for the unprivileged domain, such that in a next booting process the hypervisor initiates the virtual MBR to have the initial settings of the MBR of the physical drive and to indicate that the virtual partition having a reference to the OS in the physical drive is an active bootable partition, and (b) storing configurations of the unprivileged domain in a configuration space of the physical drive for the unprivileged domain, such that in a next booting process the hypervisor initiates the unprivileged domain to emulate hardware configurations of the computer system.

Certain aspects of the present disclosure are directly to a system for installation of a virtual service processor. The system includes a computer system that has a processor, a physical drive having a first partition including an operating system (OS) and a master boot record (MBR) with initial settings indicating the first partition as an active bootable partition. The system also includes a non-transitory computer storage medium. The non-transitory computer storage medium stores computer-executable instructions, and when these instructions are executed by the processor of the computer, these instructions cause the processor to: (a) load computer-executable instructions from the non-transitory computer storage medium and execute a hypervisor that has a privileged domain and an unprivileged domain, (b) initiate a virtual service processor (VSP) in the privileged domain, and the VSP is configured to manage at least one health, operation, or performance related aspect of the computer system, (c) configure the unprivileged domain to allow the operating system to run directly on the computer system, and (d) load and execute the OS in the unprivileged domain.

In certain embodiments, the computer-executable instructions stored in the non-transitory computer storage medium also cause the processor to: (a) initiate a virtual drive having (i) a virtual partition that includes a reference to the OS stored in the physical drive in the unprivileged domain, and (ii) a virtual MBR that indicates the virtual partition as an active bootable partition, (b) instruct a virtue CPU of the hypervisor, in accordance with the virtual MBR, to load an OS from the virtual partition and execute that OS of the virtual partition in the unprivileged domain, (c) load the OS from the first partition of the physical drive, and (d) executing the hypervisor to provide the loaded OS to the virtual CPU.

In certain embodiments, the computer-executable instructions stored in the non-transitory computer storage medium further cause the processor to: (a) configure the virtual MBR to have same settings as the initial settings of the MBR of the physical drive, (b) configure the unprivileged domain to emulate hardware configurations of the computer system, (c) create a second partition in the physical drive, (d) copy a virtual SP environment file including a hypervisor file and a virtual SP file from the non-transitory computer storage medium to the second partition of the physical drive, where the virtual SP environment file is a bootable file instructing the processor to initiate the hypervisor and to initiate the VSP in the privileged domain of the hypervisor, and (e) modify a partition table of the MBR of the physical drive to have settings indicating that the second partition of the physical drive is an active bootable partition.

In certain embodiments, the computer-executable instructions stored in the non-transitory computer storage medium also cause the processor to: (a) store configurations of the virtual MBR in a configuration space of the physical drive for the unprivileged domain, such that in a next booting process the hypervisor initiates the virtual MBR to have the initial settings of the MBR of the physical drive and to indicate that the virtual partition having a reference to the OS in the physical drive is an active bootable partition, and (b) store configurations of the unprivileged domain in a configuration space of the physical drive for the unprivileged domain, such that in a next booting process the hypervisor initiates the unprivileged domain to emulate hardware configurations of the computer system.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1A:
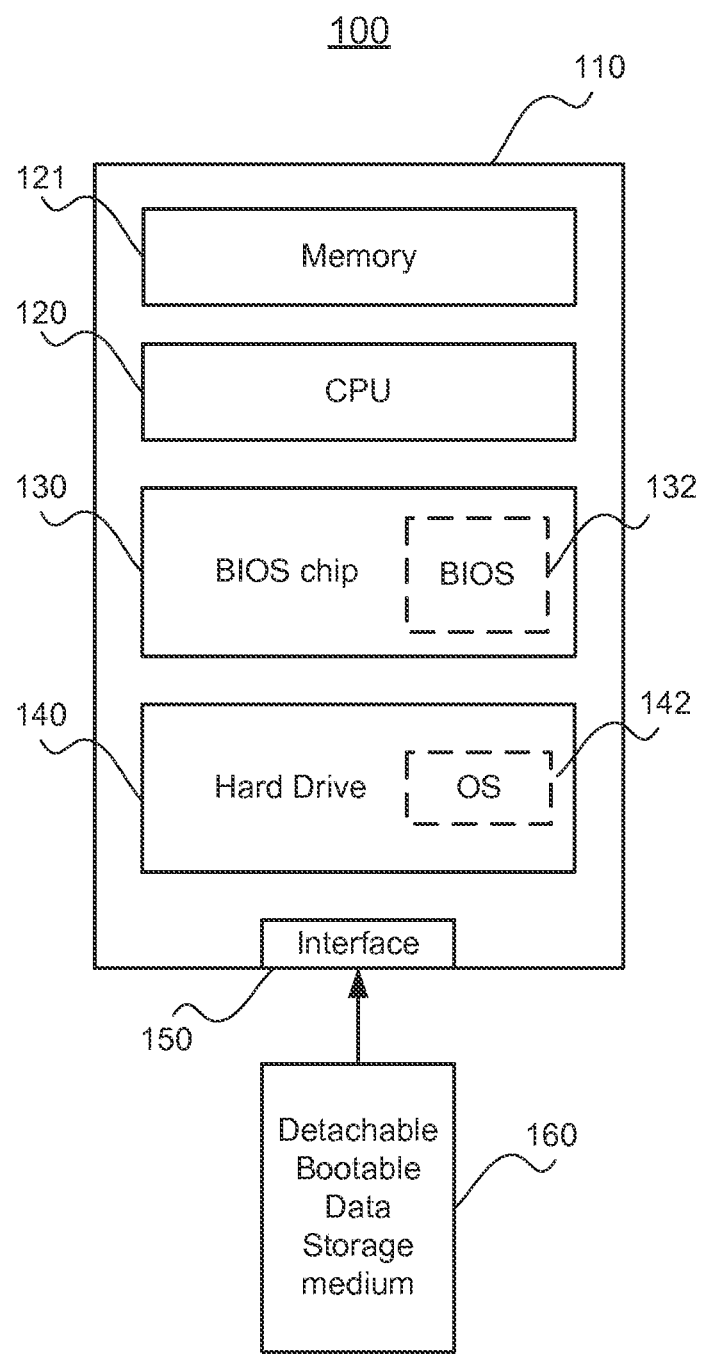
FIG. 1A schematically depicts a computer system having an existing OS according to one embodiment of the present disclosure.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "memory" generally refers to the physical devices used to store programs (sequences of instructions) or data (e.g. program state information) on a temporary or permanent basis for use in a computer or other digital electronic device. The terms "non-volatile memory" or "nonvolatile memory" refer to computer memory that can retain the stored information even when not powered, and the term "volatile memory" refers to computer memory that requires power to maintain the stored information.

As used herein, the term "virtual machine" or its abbreviation "VM" generally refers to a software implementation or virtualized simulation of a machine (i.e. a computer) that executes programs like a physical machine. A VM may be based on specifications of a hypothetical computer or emulate the architecture and functioning of a real world computer.

As used herein, the term "guest operating system" or its abbreviation "guest OS" generally refers to the operating system being installed and run in a virtual machine. To run an operating system as the guest OS on a VM, the VM must be configured in the same way that a computer is configured to run the OS.

As used herein, the term "hypervisor" generally refers to a piece of computer software, firmware or hardware that creates and runs virtual machines. The hypervisor is sometimes referred to as a virtual machine manager (VMM).

As used herein, the term "communication" generally refers to communication through physical or non-physical connections between computer components or devices with or without intermediate communicating devices, links, interface or other intercommunicating media. Communication can be generally performed by, but not limited to, non-physical signals such as electronic, magnetic, optical or other types of signals.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The invention described herein relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The methods described herein may be implemented by one or more computer programs executed by one or more processors of a computer system. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

FIG. 1A schematically depicts a computer system having an existing OS according to one embodiment of the present disclosure. As shown in FIG. 1A, a computer system 100 is provided as a stand-alone, general purpose computer system. One of ordinary skill in the art would appreciate that the computer system 100 discussed throughout the present disclosure can be of various types, such as desktop computers, laptop computers, tablet computers, hand-held computers, server computers, blade servers, industrial computers, embedded computers, appliances controllers, electronics equipment controllers, etc. The computer system 100 can be a special purpose computer system or a system that incorporates more than one interconnected system, such as a client-server network.

The computer system 100 of FIG. 1A only represents an exemplary embodiment of the present disclosure, and therefore should not be considered to limit the disclosure in any manner. In some embodiments, the computer system 100 may include other physical or virtual components not shown in FIG. 1 for purposes not mentioned in the disclosure.

In the computer system 100, a chassis 110 is provided to enclose various components or devices of the computer system 100. Although not explicitly shown in FIG. 1A, a baseboard is provided in the chassis 110, which is a printed circuit board to which a plurality of components or devices may be disposed thereon and be interconnected. The layout of the components on the baseboard and the manner of the interconnection between the components on the baseboard is herein referred to as the "configuration" of the baseboard. One of ordinary skill in the art would appreciate that the configuration of the baseboard may be adjusted or changed according to the necessary design or manufacturing requirements.

In one embodiment, the components in the chassis 110 include, but not limited to, a central processing unit (CPU) 120, a memory 121, a Basic Input/Output System (BIOS) chip 130, a hard drive 140, an interface 150, and other required memory and Input/Output modules (not shown). Further, a detachable bootable data storage medium 160 is provided outside the chassis 110, and the detachable bootable data storage medium 160 is connected to the computer system 100 through the interface 150. In certain embodiments, the interface between the components may be physical hardware interface such as electrical connectors, buses, ports, cables, terminals, or other I/O devices. The CPU 120 is a host processor which is configured to control operation of the computer system 100. In some embodiments, one of ordinary skill in the art would appreciate that the computer system 100 may run on or more than one CPU as the host processor, such as two CPUs, four CPUs, eight CPUs, or any suitable number of CPUs.

The BIOS chip 130 is one of the most crucial components of the computer system 100. The BIOS chip 130 is in communication to the CPU 120, and is configured to store the BIOS software (hereinafter BIOS) 132 for performing the booting functions as described above. Generally, the BIOS chip 130 is a non-volatile chip, such as a flash memory chip, an EEPROM chip. The BIOS 132 is in communication with a complementary metal oxide semiconductor (CMOS) memory. Initial settings and configurations of the BIOS may be stored in the CMOS memory. Settings in the BIOS chip 130 may specify a set of storage devices (designated as "bootable data storage devices" or a "bootable devices") that the computer system 100 is allowed to boot from. When the computer system 100 starts up, the first job for the BIOS 132 is the power-on self-test, which initializes and identifies the system hardware devices, such as the CPU 120, memory and storage devices, display card, keyboard and mouse, and other hardware devices. The BIOS 132 then attempts to boot the computer system 100, i.e., instructs the CPU to read and execute an OS from the devices as specified in the BIOS 132. Typically the BIOS 132 attempts to load, i.e., instruct the CPU to read and execute, the boot loader software from a specified device. The boot loader software then loads an OS from that bootable device. An OS is a collection of software managing computer hardware resources and software programs. Thus, the CPU 120 can execute the OS and run an instance of the OS. Accordingly, the control of the computer system 100 is given to the OS. This process is known as booting, or booting up, which is short for bootstrapping.

In certain embodiments, the BIOS chip 130 can also be a bootable data storage medium, and the computer system 100 may be bootable from the BIOS chip 130 if necessary booting software is provided in the BIOS chip 130.

Figure 1B:
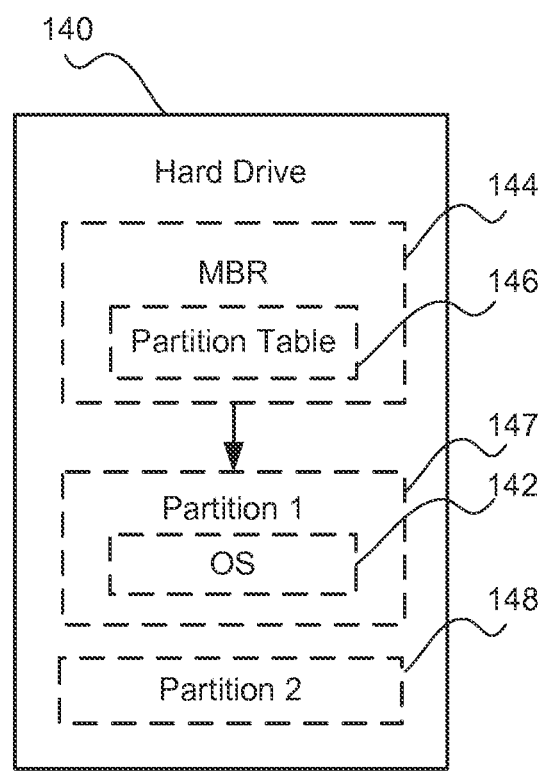
FIG. 1B schematically depicts configuration of the hard drive of the computer system of FIG. 1A according to one embodiment of the present disclosure.

The hard drive 140 is a block-based bootable data storage medium. Specifically, the hard drive 140 may be logically divided into a plurality of logical storage units, which are referred to as "partitions". FIG. 1B schematically depicts configuration of the hard drive of the computer system of FIG. 1A according to one embodiment of the present disclosure. As shown in FIG. 1B, the hard drive 140 includes a first partition 147 storing the existing OS 142. The first partition 147 can be an active bootable partition of the hard drive 140. The existing OS 142 has been configured to be run directly on the computer system 100. In other words, during a booting process, the BIOS 132 loads the existing OS 142. Then, the running instance of the existing OS 142 can be the only operating system that manages the resources of the computer system 100. Further, the hard drive 140 also includes a master boot record (MBR) 144 having a partition table 146. In certain embodiments, the hard drive 140 may include a second partition 148 or more partitions. The partition table 146 indicates, among other things, which one of the partitions of the hard drive 140 is the active bootable partition. As shown in FIG. 1B, the first partition 147 storing the existing OS 142 is a bootable partition. The MBR 144 and the partition table 146 indicate that the first partition 147 is the active bootable partition. Thus, when the computer system 100 boots from the hard drive 140, the existing OS 142 stored in the first partition 147 of the hard drive 140 will be launched and executed.

Referring back to FIG. 1A, the interface 150 is a physical input/output hardware provided on the chassis 110 for connecting the detachable bootable data storage medium 160 to connect to the computer system 100. In certain embodiments, the interface 150 may be electrical connectors, buses, ports, cables, terminals, or other I/O devices corresponding to the detachable bootable data storage medium 160.

The detachable bootable data storage medium 160 is a physical data storage device detachably connected to the computer system 100 through the interface 150. In certain embodiments, the detachable bootable data storage medium 160 may be any portable and bootable data storage device such as a memory card, a USB drive, a soft disk drive, a portable hard drive, an optical disk drive, a data cartridge, a network storage device, or any other type of portable and detachable data storage devices. To simplify the description, the USB drive will be used as an example of the detachable bootable data storage medium 160, and in this case, the corresponding interface 150 will be a USB port.

As described above, when the computer system 100 starts up, the BIOS 132 performs the booting process for booting the existing OS 142 from the hard drive 140. The computer system 100 then operates under the management of the existing OS 142. Since the existing OS 142 runs directly on the computer system 100, there is no virtualization.

Figure 2:
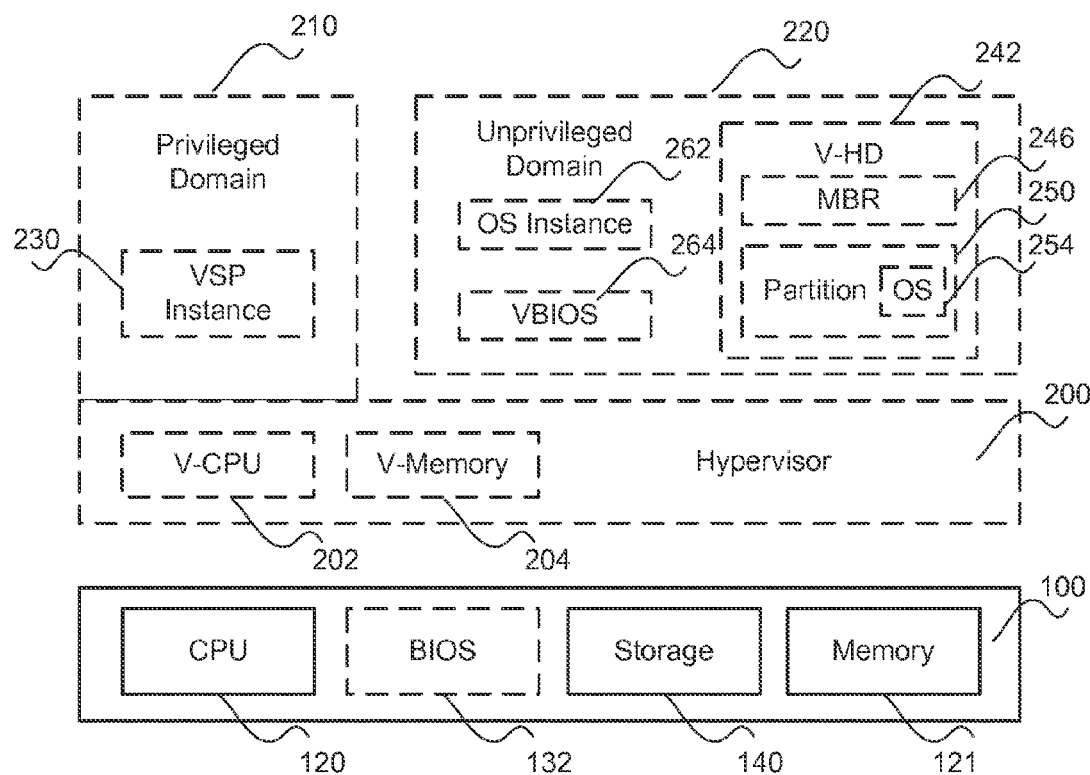
FIG. 2 schematically depicts the execution of the existing OS on the computer system when the VSP environment is installed according to one embodiment of the present disclosure.

FIG. 2 schematically depicts the execution of the existing OS on the computer system when the VSP environment is installed according to one embodiment of the present disclosure. There are computer systems or servers with no space available for a physical SP or BMC on the server hardware due to high number of systems packed within a small chassis. For example, some computer systems have packed hardware with all existing hardware elements embedded therein, and modification of the existing hardware elements is difficult and may be destructive to the computer system. In some instances, a VSP environment can provide a suitable solution. The VSP environment typically includes a hypervisor and a VSP running in the privileged domain of the hypervisor. The VSP can virtualize a complete SP or BMC hardware and the functionality while no physical SP or BMC hardware is present on the system. Running on the in-band space on the processor of a server, the VSP can offer a comprehensive manageability which is consistent across all other traditional server management solutions. Generally, a hypervisor implements hardware virtualization techniques and allows one or more OS to run concurrently as guests of one or more virtual machines on a host computer.

As shown in FIG. 2, in order to install the VSP environment in such a computer system 100 without modifying the hardware configuration of the computer system 100 or changing the existing OS 142 in a destructive way, a hypervisor 200 must be provided to run on the computer system 100. The hypervisor 200 can be of various types and designs, such as XEN, MICROSOFT HYPER-V, VMWARE ESX, or other types of hypervisor. The hypervisor 200 can emulate a plurality of domains, including a privileged domain 210, and an unprivileged domain 220 (i.e. the virtual machine). Thus, the VSP module 230 runs in the privileged domain 210, and the existing OS 142 runs in the unprivileged domain (the virtual machine) 220 instead of running directly on the physical machine of the computer system 100 directly.

The VSP module 230, when running in the privileged domain 210, functions similarly to a physical system-on-a-chip BMC installed in the computer system 100. For example, the computer system 100 can include different types of sensors, the VSP module 230 may be capable of obtaining data from these sensors to obtain parameters and health, operating and performance-related aspects associated with the computer system 100, such as, but not limited to, the temperature of one or more components of the computer system 100, speed of rotational components (e.g., spindle motor, CPU Fan, etc.) within the computer system 100, the voltage across or applied to one or more components within the computer system 100, and the available or used capacity of memory devices within the computer system 100. For example, if a temperature sensor is disposed near the CPU 120, the VSP module 230 may receive data from the temperature sensor and determine whether the CPU 120 exceeds a prescribed temperature. When the VSP module 230 determines that the temperature of CPU 120 exceeds prescribed temperature, the VSP module 230 may issue an instruction to the CPU fan to cool down the CPU 120. In certain embodiments, the VSP module 230 may include various applications and software for, among other things, implementing different baseboard management functions. In certain embodiments, the VSP module 230 can provide advanced monitoring features and more detailed hardware information (such as temperatures in different thermal zones).

In certain embodiments, the VSP module 230 adheres to the Intelligent Platform Management Interface (IPMI) industry standard for system monitoring and event recovery. The IPMI standard is well-known to those of ordinary skill in the industry, and therefore not described in detail herein. Rather, revision 1.1 of the IPMI Specification, version 1.5, release date Feb. 20, 2002, is incorporated herein by reference.

Figure 3A:
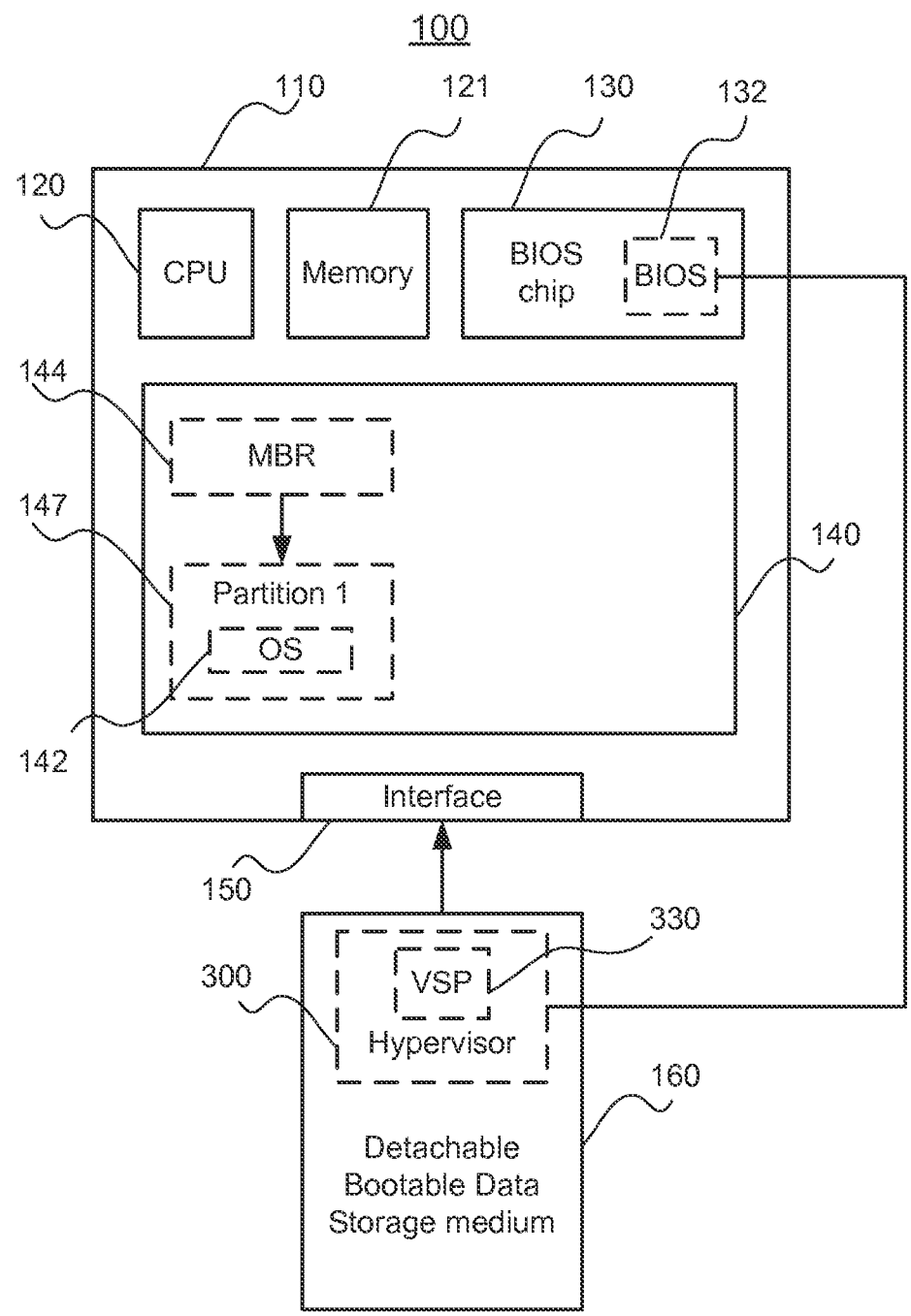
FIG. 3A schematically depicts installation of a VSP environment by a detachable bootable data storage medium to the computer system according to one embodiment of the present disclosure.
Figure 3B:
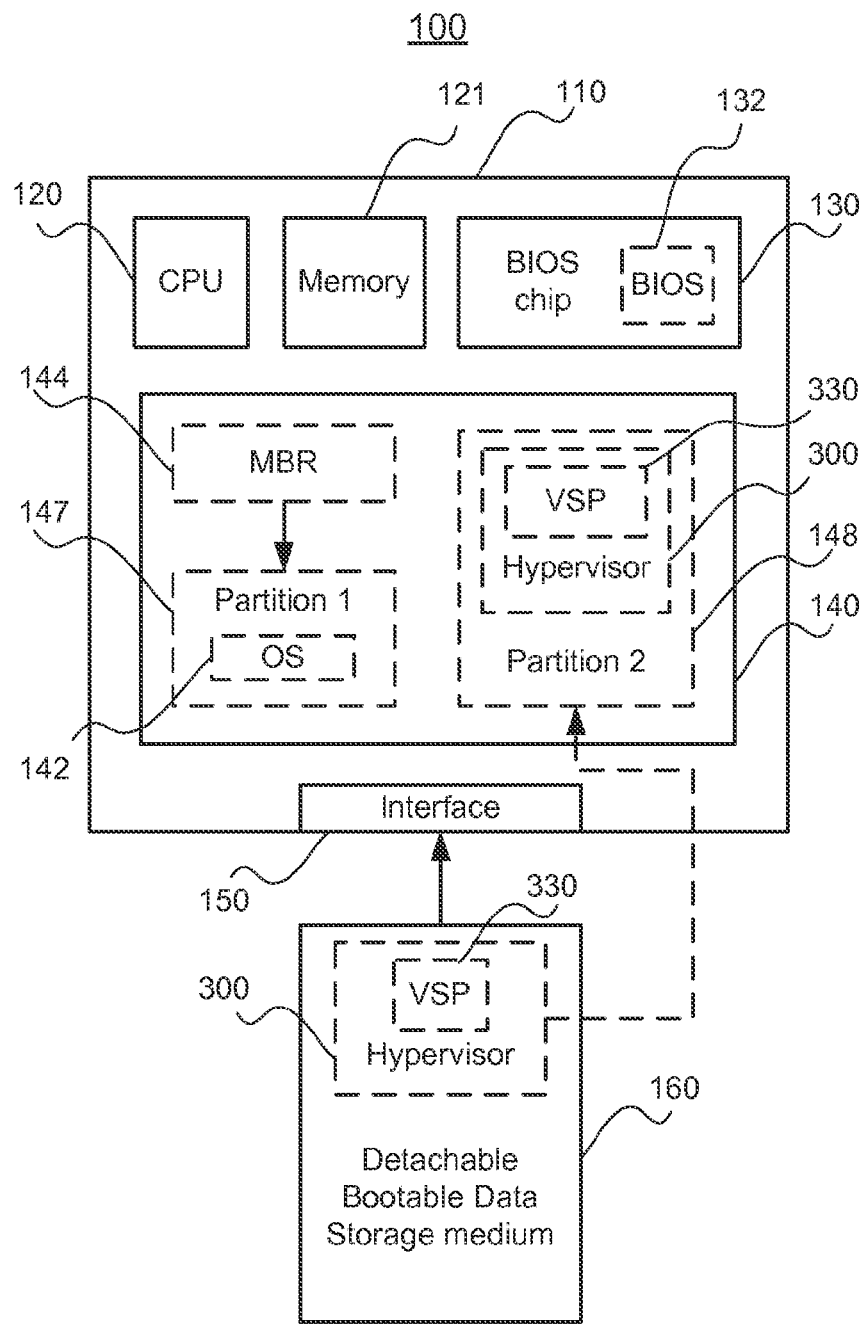
FIG. 3B schematically depicts copying the VSP environment to the hard drive of the computer system according to one embodiment of the present disclosure.
Figure 3C:
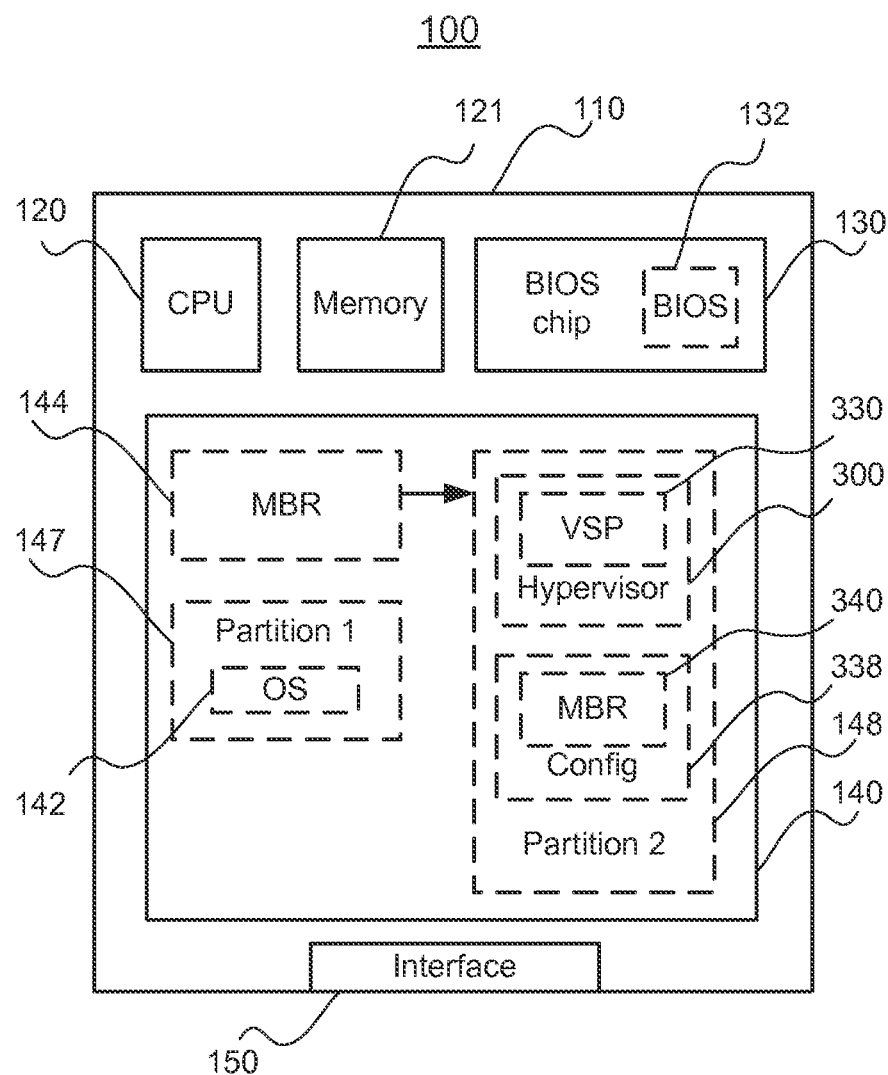
FIG. 3C schematically depicts setting the partition for the VSP environment in the hard drive of the computer system according to one embodiment of the present disclosure.

FIGS. 3A to 3C schematically depict installation of a VSP environment to the computer system according to one embodiment of the present disclosure. In the description below, a USB drive 160 and a USB interface 150 may be used as examples of a detachable bootable data storage medium 160 and the corresponding interface 150. One skilled in the art would appreciate that other types of detachable bootable data storage medium can be similarly used in place of the USB drive.

To install the VSP environment to the computer system, initially the BIOS 132 and the CMOS memory of the computer system 100 are changed, when necessary, to specify that a USB drive is the first in order of the devices from which the computer system 100 is allowed to boot. The VSP environment is stored in the USB drive 160 as a bootable file. Thus, when the computer system 100 is powered on, the BIOS 132 of the computer system 100, in accordance with the configuration of the CMOS, can instruct the CPU 120 to attempt to boot from the attached USB drive 160. The VSP environment includes a hypervisor 200 and a VSP module 230 configured to run within the privileged domain 210 of the hypervisor 200. As shown in FIG. 3A, the USB drive 160 storing the VSP environment can be inserted to the USB interface 150 of the computer system 100. Then, the BIOS 132 instructs the CPU 120 to boot the computer system 100 from the USB drive 160. Under the instruction of a boot loader in the VSP environment, the CPU 120 loads the hypervisor 300 into the memory 121 and executes the hypervisor 300. As discussed above, the existing MBR 144 has a partition table 146 indicating the active bootable partition of the hard drive 140. Referring back to FIG. 2, the hypervisor 200 can communicate with the BIOS 132 for managing the hardware and can detect the hardware configuration of the computer system 100 including the CPU 120, the memory 121, the disks, I/O devices, and network devices. The hypervisor 200 also installs necessary device drivers for managing those devices. Then the hypervisor 200 initiates the VSP module 230 in the privileged domain 210. The hypervisor 200 creates a virtual machine (unprivileged domain) 220 having a virtual hardware configuration as the actual physical hardware configuration. In other words, a guest running in the virtual machine would perceive that it actually runs on a physical machine having those hardware configurations. Further, in the process of setting up a virtual machine 220, the hypervisor 200 can read the existing MBR 144 of the hard drive 140 and use it as the virtual MBR for that virtual machine 220. More specifically, during initialization of the virtual machine 220, a virtual BIOS 264 of the virtual machine 220 starts a booting process of the virtual machine 220. The virtual BIOS 264 determines, e.g. based on the configuration of a virtual CMOS, from which device it should load an operating system. The settings of virtual CMOS, which is the same as or similar to the original settings of the CMOS of the computer system 100, indicates that the virtual hard drive 242 is the device from which an operating system should be loaded by the virtual BIOS 264. The hypervisor 200 has set up the virtual hard drive 242 to have a mirroring or corresponding configuration of the original physical hard drive 140. In other words, the virtual hard drive 242 has a virtual MBR 246 that indicates that a first partition 250 including an operating system 254 is the active bootable partition. The first partition 250 of the virtual hard drive 242 has a reference to the first partition 147 of the physical hard drive 140. Thus, the virtual BIOS 264 (instructing the virtual CPU 202) reads the virtual MBR 246 and finds that it should load the OS 254 from the first partition 250 of the virtual hard drive 242. The hypervisor 200 operates the virtual CPU 202 and the virtual hard drive 242 for the virtual machine 220, and translates the requests directed to the virtual hard drive 242 to requests directed to the physical hard drive 140. In this example, the hypervisor 200 loads the existing OS 142 stored in the first partition 147 of the physical hard drive 140 and provides the existing OS 142 to the virtual BIOS 264 as an OS 254 stored in the first partition 250 of the virtual hard drive 242. The virtual BIOS 264 instructs the virtual CPU 202 to load the boot loader of the existing OS 254, which then instructs the virtual CPU 202 to load the rest of the existing OS 254. In this way, the virtual machine 220 runs an instance 262 of the existing OS 254.

Referring to FIG. 3A, in certain embodiments, the VSP module instance 230 running in the privileged domain 210 of the hypervisor 200 can create a second partition 148 in the physical hard drive 140 and copy the VSP file 330 and the hypervisor file 300 from the detachable bootable data storage medium 160 to the second partition 148 as shown in FIG. 3B. The running VSP instance 230 modifies the partition table (not shown) of the MBR 144 of the hard drive 140 to indicate that the second partition 148 storing the VSP environment file 330 is the active bootable partition. The running VSP instance 230 copies the original MBR 144 of the hard drive 140 into the configuration space 338 of the virtual machine 220 such that the configuration space 338 stores a MBR configuration 340 that is the same as the original MBR 140. During initialization of the virtual machine 220, the hypervisor 200, in accordance with the MBR configuration 340 stored in the configuration space 338, configures the virtual hard drive 242 to have a MBR 246 having the same settings as those of the original MBR 140.

Once the VSP environment file 300 has been copied to the second partition 148 of the physical hard drive 140 and that the settings of the original MBR has been copied to the configuration space 338 of the virtual machine 220, in the next booting process, the computer system 100 can boot the VSP environment even if the USB drive 160 has been removed from the computer system 100. More specifically, initially the BIOS 132 determines that the hard drive 140 is the device from which an OS should be loaded by the BIOS 132. Then, the BIOS 132 reads the modified MBR 144 of the hard drive 140. The modified MBR 144 of the hard drive 140 now indicates that the second partition 148 storing the VSP environment file 300 as the active bootable partition. Accordingly, the BIOS 132 instructs the CPU 120 to read the boot loader from the second partition 148. Subsequently, the boot loader instructs the CPU 120 to load the hypervisor 300 from the second partition 148 such that a hypervisor instance 200 is running. The hypervisor instance 200 creates a privileged domain 210 and initiates a VSP instance 230 in that domain 210. Further, the hypervisor instance 200 also creates an unprivileged domain 220 (the virtual machine), which has been configured to emulates the original settings of the computer system 100. The MBR 246 of the virtual hard drive has the same configuration as the original MBR 340 of the physical hard drive 140, indicating that the first partition 250 of the virtual hard drive 242 having the existing OS 254 as the active bootable partition. The virtual BIOS 264 accordingly instructs the virtual CPU 202 to load the operating system 254 stored in the first partition 250 of the virtual hard drive 242. As discussed above, the hypervisor 200 loads the existing OS 142 stored in the first partition 147 of the physical hard drive 140 in the virtual machine 220. In certain embodiments, during the installation process, system modifications, other than modifying the BIOS 132 in order to boot from the USB drive 160, may not be necessary in order to install the VSP environment. There is no destructive change to the existing OS 142 stored in the hard drive 140. In other words, the installation of the VSP to the computer system 100 is non-destructive.

The foregoing description of the exemplary embodiments of the disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention. Accordingly, the scope of the present disclosure is defined by the appended claims rather than the foregoing description and the exemplary embodiments described therein.

What is claimed is:

1. A non-transitory computer storage medium having computer-executable instructions stored thereon which, when executed by a processor of a computer system that has a physical drive having a first partition including an operating system (OS) and having a master boot record (MBR) with initial settings indicating the first partition as an active bootable partition, cause the processor to:
load and execute a hypervisor from the non-transitory computer storage medium, the hypervisor having a privileged domain and an unprivileged domain;
initiate a virtual service processor (VSP) in the privileged domain, the VSP being configured to manage at least one health, operation, or performance related aspect of the computer system;
configure the unprivileged domain to allow the operating system to run therein, the operating system (OS) being executable directly on the computer system;
load and execute the OS in the unprivileged domain;
create a second partition in the physical drive;
copy a VSP environment file including a hypervisor file and a VSP file from the non-transitory computer storage medium to the second partition of the physical drive, wherein the VSP environment file is a bootable file instructing the processor to initiate the hypervisor and to initiate the VSP in the privileged domain of the hypervisor; and
modify a partition table of the MBR of the physical drive to have settings indicating that the second partition of the physical drive is an active bootable partition.

2. The non-transitory computer storage medium of claim 1, wherein the instructions, when executed, cause the processor to:
initiate a virtual drive in the unprivileged domain, the virtual drive having a virtual partition that includes a reference to the OS stored in the physical drive and a virtual MBR that indicates the virtual partition as an active bootable partition; and
instruct a virtue CPU of the hypervisor, in accordance with the virtual MBR, to load an OS from the virtual partition and execute that OS of the virtual partition in the unprivileged domain.

3. The non-transitory computer storage medium of claim 2, wherein the instructions, when executed, further cause the processor to:
load the OS from the first partition of the physical drive; and
execute the hypervisor to provide the loaded OS to the virtual CPU.

4. The non-transitory computer storage medium of claim 2, wherein the instructions, when executed, further cause the processor to:
configure the virtual MBR to have same settings as the initial settings of the MBR of the physical drive.

5. The non-transitory computer storage medium of claim 2, wherein the instructions, when executed, further cause the processor to:
configure the unprivileged domain to emulate hardware configurations of the computer system.

6. The non-transitory computer storage medium of claim 1, wherein the instructions, when executed, further cause the processor to:
store, in the physical drive, configurations of the virtual MBR in a configuration space for the unprivileged domain, such that in a next booting process the hypervisor initiates the virtual MBR to have the initial settings of the MBR of the physical drive and to indicate that the virtual partition having a reference to the OS in the physical drive is an active bootable partition.

7. The non-transitory computer storage medium of claim 1, wherein the instructions, when executed, further cause the processor to:
store, in the physical drive, configurations of the unprivileged domain in a configuration space for the unprivileged domain, such that in a next booting process the hypervisor initiates the unprivileged domain to emulate hardware configurations of the computer system.

8. The non-transitory computer storage medium of claim 1, wherein the non-transitory computer storage medium comprises a detachable bootable data storage medium.

9. The non-transitory computer storage medium of claim 8, wherein the detachable bootable data storage medium comprises a universal serial bus (USB) disk, a memory card, a soft disk drive, a portable hard drive, an optical disk drive, a data cartridge, or a network storage device.

10. A method for installation of a virtual service processor to a computer system that has a processor, a physical drive having a first partition including an operating system (OS)

and having a master boot record (MBR) with initial settings indicating the first partition as an active bootable partition, comprising:
- loading and executing a hypervisor from a non-transitory computer storage medium having computer-executable instructions stored thereon, the hypervisor having a privileged domain and an unprivileged domain;
- initiating a virtual service processor (VSP) in the privileged domain, the VSP being configured to manage at least one health, operation, or performance related aspect of the computer system;
- configuring the unprivileged domain to allow the operating system to run therein, the operating system (OS) being executable directly on the computer system;
- loading and executing the OS in the unprivileged domain;
- creating a second partition in the physical drive;
- copying a VSP environment file including a hypervisor file and a VSP file from the non-transitory computer storage medium to the second partition of the physical drive, wherein the VSP environment file is a bootable file instructing the processor to initiate the hypervisor and to initiate the VSP in the privileged domain of the hypervisor; and
- modifying a partition table of the MBR of the physical drive to have settings indicating that the second partition of the physical drive is an active bootable partition.

11. The method of claim 10, comprising:
- initiating a virtual drive in the unprivileged domain, the virtual drive having a virtual partition that includes a reference to the OS stored in the physical drive and a virtual MBR that indicates the virtual partition as an active bootable partition;
- instructing a virtue CPU of the hypervisor, in accordance with the virtual MBR, to load an OS from the virtual partition and execute that OS of the virtual partition in the unprivileged domain;
- loading the OS from the first partition of the physical drive; and
- executing the hypervisor to provide the loaded OS to the virtual CPU.

12. The method of claim 11, comprising:
- configuring the virtual MBR to have same settings as the initial settings of the MBR of the physical drive; and
- configuring the unprivileged domain to emulate hardware configurations of the computer system.

13. The method of claim 11, comprising:
- storing, in the physical drive, configurations of the virtual MBR in a configuration space for the unprivileged domain, such that in a next booting process the hypervisor initiates the virtual MBR to have the initial settings of the MBR of the physical drive and to indicate that the virtual partition having a reference to the OS in the physical drive is an active bootable partition; and
- storing, in the physical drive, configurations of the unprivileged domain in a configuration space for the unprivileged domain, such that in a next booting process the hypervisor initiates the unprivileged domain to emulate hardware configurations of the computer system.

14. The method of claim 10, wherein the non-transitory computer storage medium is a detachable bootable data storage medium, wherein the detachable bootable data storage medium comprises a universal serial bus (USB) disk, a memory card, a soft disk drive, a portable hard drive, an optical disk drive, a data cartridge, or a network storage device.

15. A system for installation of a virtual service processor, comprising:
- a computer system that has a processor, a physical drive having a first partition including an operating system (OS) and having a master boot record (MBR) with initial settings indicating the first partition as an active bootable partition; and
- a non-transitory computer storage medium having computer-executable instructions stored thereon which, when executed by the processor, causing the processor to:
  - load and execute a hypervisor from the non-transitory computer storage medium, the hypervisor having a privileged domain and an unprivileged domain;
  - initiate a virtual service processor (VSP) in the privileged domain, the VSP being configured to manage at least one health, operation, or performance related aspect of the computer system;
  - configure the unprivileged domain to allow the operating system to run therein, the operating system (OS) being executable directly on the computer system;
  - load and execute the OS in the unprivileged domain;
  - create a second partition in the physical drive;
  - copy a VSP environment file including a hypervisor file and a VSP file from the non-transitory computer storage medium to the second partition of the physical drive, wherein the VSP environment file is a bootable file instructing the processor to initiate the hypervisor and to initiate the VSP in the privileged domain of the hypervisor; and
  - modify a partition table of the MBR of the physical drive to have settings indicating that the second partition of the physical drive is an active bootable partition.

16. The system of claim 15, wherein the instructions, when executed, cause the processor to:
- initiate a virtual drive in the unprivileged domain, the virtual drive having (a) a virtual partition that includes a reference to the OS stored in the physical drive and (b) a virtual MBR that indicates the virtual partition as an active bootable partition;
- instruct a virtue CPU of the hypervisor, in accordance with the virtual MBR, to load an OS from the virtual partition and execute that OS of the virtual partition in the unprivileged domain;
- load the OS from the first partition of the physical drive; and
- execute the hypervisor to provide the loaded OS to the virtual CPU.

17. The system of claim 16, wherein the instructions, when executed, cause the processor to:
- configure the virtual MBR to have same settings as the initial settings of the MBR of the physical drive; and
- configure the unprivileged domain to emulate hardware configurations of the computer system.

18. The system of claim 16, wherein the instructions, when executed, cause the processor to:
- store, in the physical drive, configurations of the virtual MBR in a configuration space for the unprivileged domain, such that in a next booting process the hypervisor initiates the virtual MBR to have the initial settings of the MBR of the physical drive and to indicate that the virtual partition having a reference to the OS in the physical drive is an active bootable partition; and
- store, in the physical drive, configurations of the unprivileged domain in a configuration space for the unprivileged domain, such that in a next booting process the hypervisor initiates the unprivileged domain to emulate hardware configurations of the computer system.

19. The system of claim 15, wherein the non-transitory computer storage medium is a detachable bootable data storage medium, wherein the detachable bootable data storage medium comprises a universal serial bus (USB) disk, a memory card, a soft disk drive, a portable hard drive, an optical disk drive, a data cartridge, or a network storage device.

* * * * *